Nov. 20, 1934.   P. A. DUBUS   1,981,096
BEARING FOR COFFEE ROASTERS
Filed July 31, 1933   4 Sheets-Sheet 1

INVENTOR,
Peter A. Dubus
BY Ivan P. Tashof,
ATTORNEY.

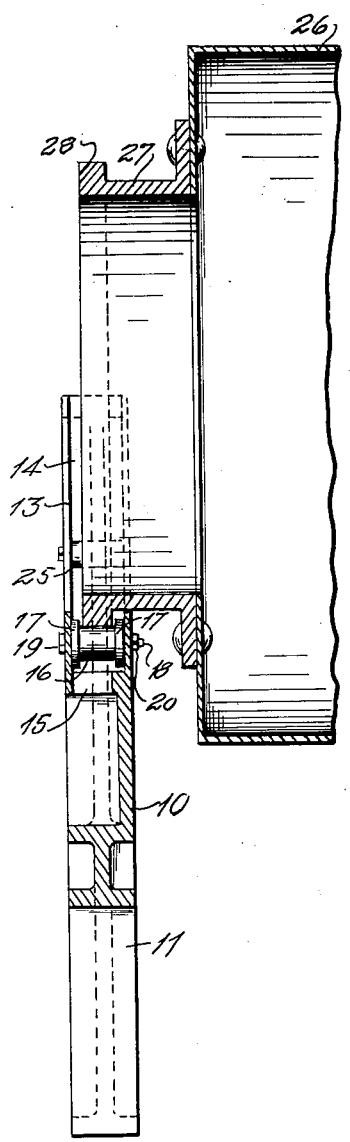

Nov. 20, 1934. P. A. DUBUS 1,981,096
BEARING FOR COFFEE ROASTERS
Filed July 31, 1933 4 Sheets-Sheet 3

INVENTOR.
BY Peter A. Dubus
Ivan P. Tashof
ATTORNEY.

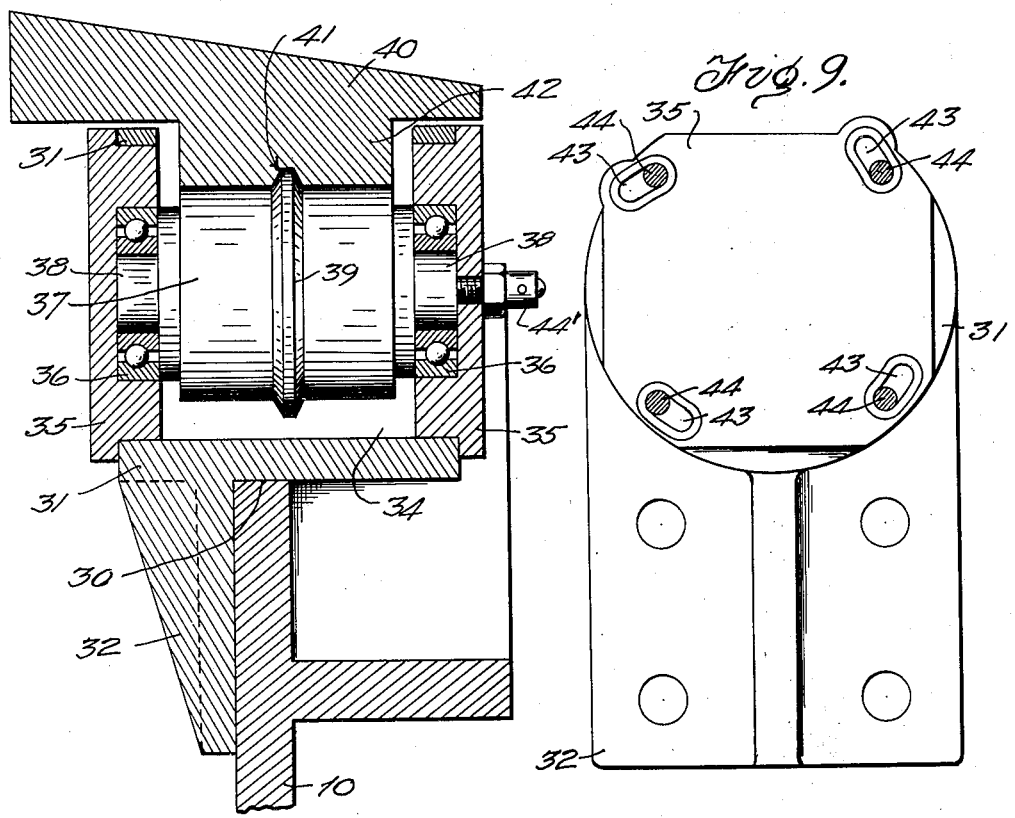
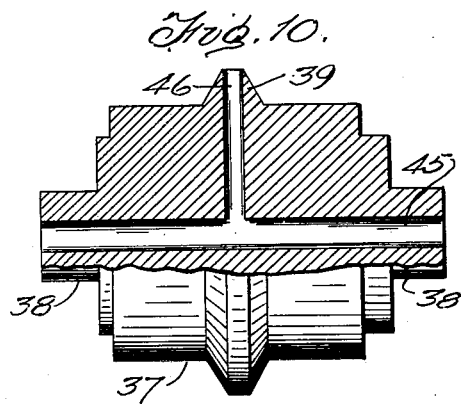
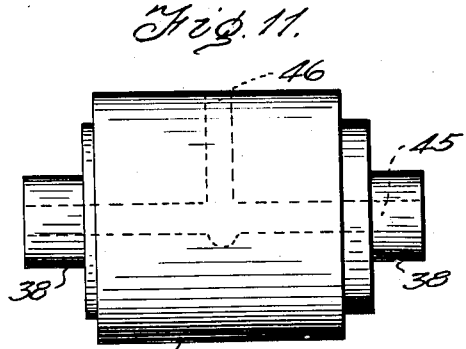

Patented Nov. 20, 1934

1,981,096

UNITED STATES PATENT OFFICE 1,981,096

BEARING FOR COFFEE ROASTERS

Peter A. Dubus, New Orleans, La.

Application July 31, 1933, Serial No. 683,060

10 Claims. (Cl. 308—203)

This invention relates to coffee roasters, and has special reference to the bearings which support the revoluble cylinders of coffee roasters.

In the usual type of coffee roasters there is provided a roasting cylinder to contain the coffee during the roasting operation. Such roasting cylinders are usually made of thin sheet metal and are provided on their ends with reinforcing rings which form journals for supporting the cylinders revolubly in bearings. The bearings for such journal rings are commonly in the form of arcuate or crescent shaped castings. Journals and bearings of this character require much lubrication, and it is difficult to keep them properly lubricated because of the large size of the bearing surface and the heating of the journal rings during the roasting operation.

One important object of the invention is to provide an improved form of roller bearing for use with coffee roasters.

In the construction of certain types of journal rings used with coffee roasters, each ring is provided with a peripheral flange which seats in a channel like bearing.

Journal flanges and channel bearings have the property of preventing longitudinal movement of the journals in the bearings. Roller bearings have been devised for revolving cylinders, but such roller bearings as have heretofore been used in connection with end journals neither prevent longitudinal movement of the journals in the bearings nor provide means for permitting the use of open or uncapped bearings while holding the journal rings from accidentally jumping out of place.

A second important object of the invention is to provide a novel combination of flanged journal ring and bearing therefor wherein the bearing will combine the advantages of both roller and channel bearings.

In coffee roasters and the like, it is advantageous to use open bearings for the journals of the rotating cylinders but such open bearings have the disadvantage that coffee grains are apt to fall into the bearings and create much friction between the journals and their bearings.

A third important object of the invention is to provide a coffee roaster roller bearings of the open type wherein any coffee grains or the like which accidentally drop into the bearing will at once pass out and will not be caught between contacting bearing surfaces.

It is very desirable that there be as little friction as possible in the rotation of coffee roasters and also that such roasters be uniformly supported so that the supporting rollers will have substantially the same pressure on them and to this end it is desirable that such rollers be adjustable for wear and to insure such uniformity of support.

The fourth important object of the invention is therefore to provide a novel arrangement of roller wherein the roller is journalled on antifriction bearings and wherein provision is made for adjustment so that wear may be taken up and mal-adjustment be corrected.

With the above and other objects in view, the invention consists in general of certain novel details of construction and combination of parts hereinafter fully described, illustrated in the accompanying drawings and specifically claimed.

In the accompanying drawings like characters of reference indicate like parts in the several views, and;

Fig. 3 is a section on the line 3—3 of Figure 1;

Fig. 4 is an enlarged detail section on the line 4—4 of Fig. 1;

Fig. 5 is an enlarged detail plan view of the central portion of the bearing with the rollers removed;

Fig. 8 is an enlarged detail section on the line 8—8 of Fig. 6;

Fig. 9 is an enlarged view of one of the bearing brackets and showing the arrangement by which the roller supported by this bracket may be adjusted vertically;

Fig. 10 is a still further enlarged view, partly in section, and showing the oiling arrangement for the roller shown in Fig. 8.

Fig. 11 is a side elevation showing a modified form of roller adapted to be used in place of the roller of Figure 10 at one end of the roaster.

Figure 1:
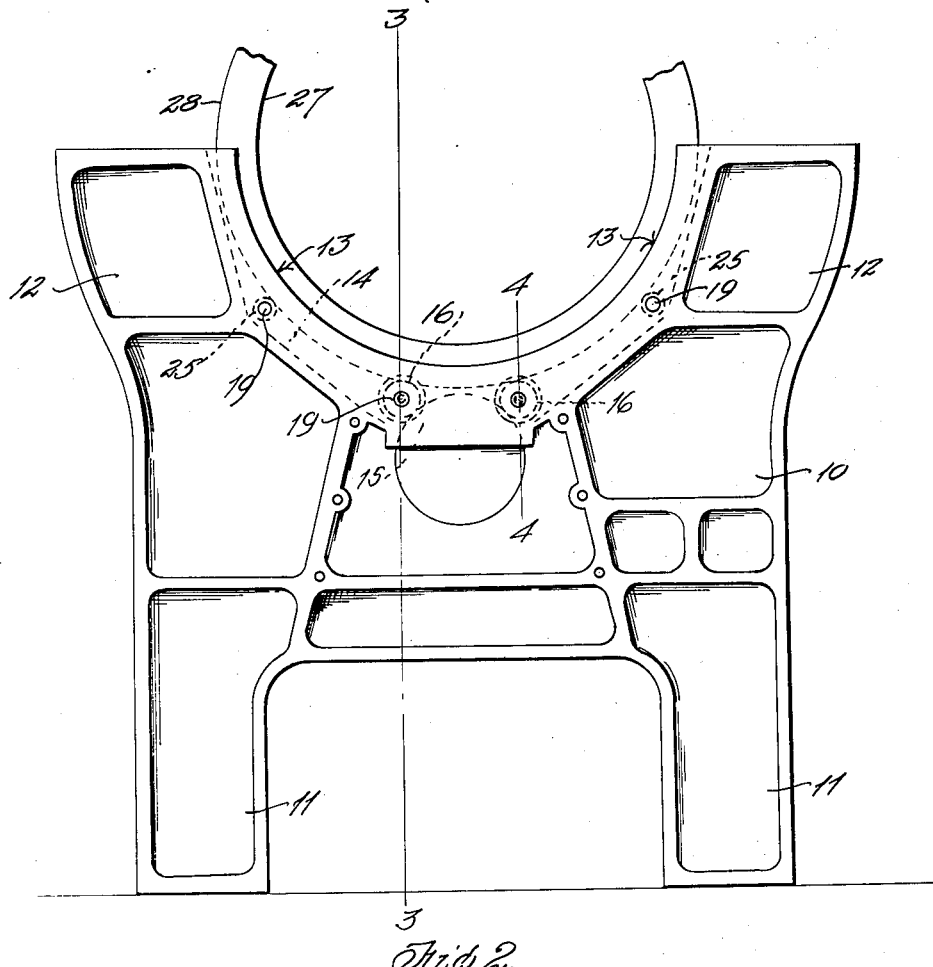
Figure 1 is an end elevation of one form of the improved bearing with a portion of a journal ring supported therein.

In the forms of the invention as here shown the construction at only one end of the roaster is shown but it is to be understood that a like construction is used at the other end of the roaster. In each form the bearing is preferably a casting of iron or other suitable material of approximately H-shape in elevation. This casting has a body portion 10 having a downwardly extending pair of supporting legs 11. Extending upwardly from the body is a pair of arms 12 having their inner or proximal edges 13 uniting to form an arc, the center of which is at the axis of rotation of the roasting cylinder. A channel 14 is formed in this arcuate portion, the edge portions proper forming the flanges of the channel. The web or bottom of the channel is interrupted at its central part to form an outlet opening 15 best seen in Fig. 5.

Figure 2:
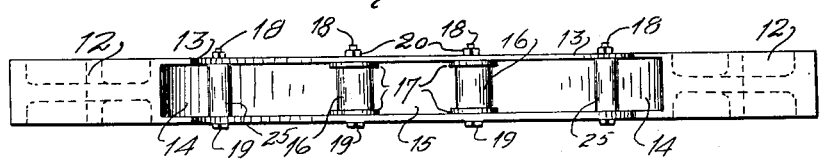
Fig. 2 is a plan view of such a bearing.
Figure 6:
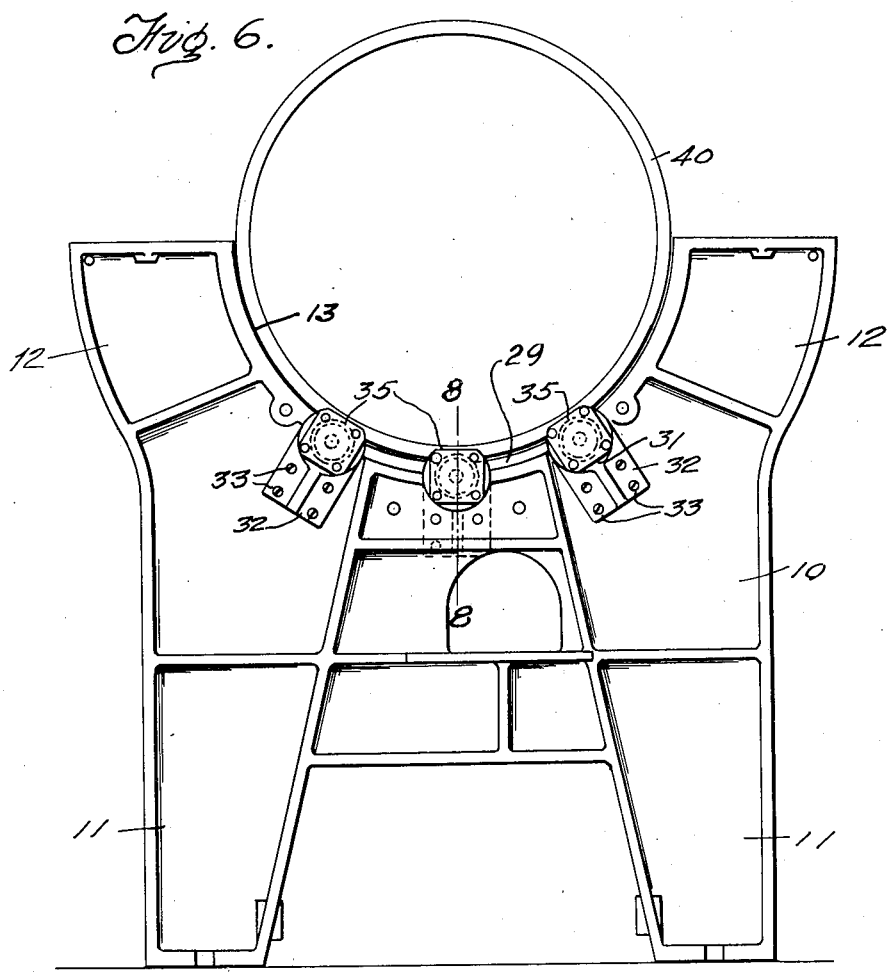
Fig. 6 is an end elevation of a second form of the improved bearing, the view showing one of the journal rings of the coffee roaster.
Figure 7:
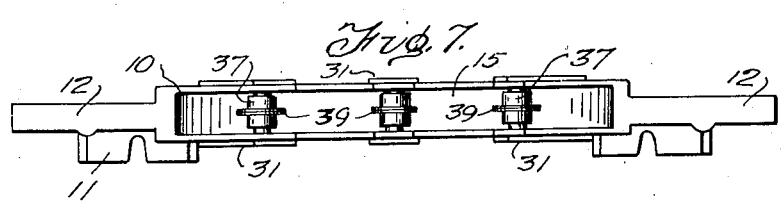
Fig. 7 is a top plan view of this second form of bearing.

Referring to the form shown in Figs. 1 to 5 inclusive, just above each end edge of this opening 15 is a roller 16 provided with end flanges 17 which is mounted in the channel on a shaft 18 which extends through the flanges. A head 19 is formed on one end of each shaft which bears against the outer face of one flange. The other end of the shaft is threaded and on this threaded end is a nut 20 which bears against the outer face of the other flange. The rollers are each provided with a pair of spaced bushings 21, the spacing of the bushings forming an oil groove 22 wherewith communicates an oil passage 23 leading from the head end of the shaft. The passage 23 has its inlet end enlarged and threaded as at 24 so that a grease or oil cup (not shown) may be screwed to the shaft. Other rollers 25 are similarly mounted in the channel in spaced relation to the first rollers and the rollers 25 are preferably of simple cylindrical form without flanges.

The roasting cylinder 26 (Fig. 3) is provided on its end with a journal ring 27 having on its outer end a flange 28 which rests on the rollers 16 and 25.

By reason of this construction the roasting cylinder is supported for easy rotation and the channel flanges keep the flange 28 from jumping out of place even if it chances to move off its roller supports. The housing of the rollers in the channel thus provides extra safety in the operation of the roaster.

Also, the opening 15 permits any coffee grains or other material which may accidentally fall into the channel to pass freely from said channel.

In the form of the invention shown in Figures 8 to 11, the general construction of the bearing is substantially the same as that of the first described form but the roller arrangement is of somwhat different character and the rollers are not located in a channel but instead of the channel the arcuate part 29 of the body 10 is cut away as at 30 so that a housing sleeve 31 provided with a depending bracket 32 may be bolted to the body 10 by means of suitable bolts 33. In this case there are preferably three of these brackets, one being disposed centrally of the width of the body on one face of said body while the other two are spaced equally from the first mentioned sleeve and are secured on the other face of said body. Each of these sleeves has a central channel-like portion 34. Fitted in the hands of the sleeves are ball cages 35 which forms caps for closing the sleeve ends and are bored on their inner faces for the reception of ball bearings 36. In each of the sleeves is mounted a roll having a body 37 and journal ends 38 which fit in the inner races of the ball bearings 36 so that the rollers may rotate with very little friction. For the bearings at one end of the roaster the rollers may have bodies which are plain cylinders while at the other end each roller is provided with a thrust rib 39 extending around the roller preferably at the center thereof and having tapered sides. At this end the supporting or reenforcing ring 40 of the roaster is provided with a suitable groove 41 extending around the ring to receive the rib 39 and this groove is formed in a flange-like portion 42 of the ring, the portion 42 fitting between the walls of the channel 34 and acting to prevent movement of the roaster cylinder longitudinally even though the rib 39 becomes unseated from the groove 41. In order to permit adjustment of the rollers to a proper fit against the ring 40 the cages or caps 35 are provided with eccentric slots 43 wherethrough pass securing bolts 44 extending into the end walls of the sleeve 31. Thus by turning the respective cages 35, the bolts being loosened, the axis of the roller between such cages may be slightly raised or lowered and the bolts be then tightened to hold it in position.

In order to provide for proper lubrication of the groove 41 and of the two ball bearings there is screwed into one of the caps or cages 35 an oil cup 44' which communicates with a longitudinal passage 45 extending from end to end of the roller and having a transfer passage 46 extending radially of the roller and opening through the ribs 39. Thus, oil supplied through the cup 44 will flow to both bearings and also to the contacting surfaces of the rib 39 and groove 41.

It will now be observed that with this form of the invention not only do the rollers rotate with great ease but also that means are provided which permit these rollers to be so adjusted that it bears its proper proportion of the load of the coffee roaster and so that wear may be compensated with great ease.

It has heretofore been common to provide coffee roasters with ordinary plain bearings at the ends with the result that a very considerable amount of power was required to rotate such roasters. With the present invention, much less power is required and, since it is common to operate these devices with electric motors, a great saving in current is obtained. Furthermore, the construction provides for smoothness in operation and absence of vibration, permits thorough lubrication of the rollers, decreases the bearing surface, and consequent friction, and prolongs the life of the machine by reason of these features so that the efficiency of the machine has been found by tests to be increased at least 40% over the same roaster provided with the ordinary bearing arrangements.

There has thus been provided a simple and efficient device of the kind described and for the purpose specified.

It is obvious that minor changes may be made in the form and construction of the invention without departing from the material features thereof. It is not, therefore, desired to confine the invention to the exact form herein shown and described, but it is wished to include all such as come within the scope claimed.

I claim:

1. The combination with a roaster cylinder having an end plate provided with a central opening, and a ring secured to its end and forming a journal ring and a reinforcement for the end of the cylinder, said ring having a pair of flanges, one of which is secured to the end plate; of a bearing for the other flange of said journal ring, said journal ring including a body, rollers revolubly supported by said body and having the journal ring resting thereon, and means supporting said rollers and extending upwardly at opposite sides of said journal ring to prevent accidental displacement of the ring from the rollers.

2. The combination with a roaster cylinder having an end plate provided with a central opening, and a ring secured to its end and forming a journal ring and a reinforcement for the end of the cylinder, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body and rollers rotatably mounted in said channel and engaging said second flange to support the cylinder.

3. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body, and rollers rotatably mounted in said channel and engaging said second flange to support the cylinder, the sides of said channel extending above said rollers to prevent accidental displacement of said flange.

4. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body and rollers rotatably mounted in said channel and engaging said second flange to support the cylinder, certain of said rollers being provided with peripheral flanges at their ends and the flange of the ring engaging the flanged rollers between their flanges.

5. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body, and rollers rotatably mounted in said channel and engaging said second flange to support the cylinder, certain of said rollers being provided with peripheral flanges at their ends and the flange of the ring engaging the flanged rollers between their flanges, the sides of said channel extending above said rollers to prevent accidental displacement of said flange.

6. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body, and rollers rotatably mounted in said channel and engaging said second flange to support the cylinder, said channel having an opening in its bottom at the lowest part thereof to permit free escape of material dropping in the channel.

7. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body and rollers rotatably mounted in said channel and engaging said second flange to support the cylinder, said channel having an opening in its bottom at the lowest part thereof to permit free escape of material dropping in the channel, the sides of said channel extending above said rollers to prevent accidental displacement of said flange.

8. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, said body lying closely concentric to said second flange to form a guard for said second flange with the flange extending into the channel of the body and rollers rotatably mounted in said channel and engaging said second flange to support the cylinder, said channel having an opening in its bottom at the lowest part thereof to permit free escape of material dropping in the channel, certain of said rollers being provided with peripheral flanges at their ends and the flange of the ring engaging the flanged rollers between their flanges.

9. The combination with a roaster cylinder having an end plate provided with a central opening, and a ring secured to its end and forming a journal ring, the inner end of said ring being provided with a peripheral flange secured to the end plate around said opening, the outer end of said ring being provided with a peripheral flange; of a bearing including a body having an arcuate channel confronting the lower part of said second flange, and rollers rotatably mounted in said channel and engaging said second flange to support the cylinder, said channel having an opening in its bottom at the lowest part thereof to permit free escape of material dropping in the channel, certain of said rollers being provided with peripheral flanges at their ends and the flange of the ring engaging the flanged rollers between their flanges, the sides of said channel extending above said rollers to prevent accidental displacement of said flange.

10. The combination with the journal ring of a roaster cylinder; of bearing means for supporting said ring including a body, pairs of ball bearing cages supported on said body with the cages of each pair confronting each other, ball bearings mounted in said cages, a roller for each pair of cages journalled in said ball bearings and engaging the journal ring of the roaster cylinder, said cages being adjustable toward and from the journal ring, and means to secure said cages in adjustable position.

PETER A. DUBUS.